United States Patent [19]

Chewning et al.

[11] Patent Number: 5,599,139
[45] Date of Patent: Feb. 4, 1997

[54] METHOD OF CONSTRUCTING A LINER SYSTEM AND WASTE CONTAINMENT FACILITY INCORPORATING SAME

[75] Inventors: Raymond J. Chewning, Kennesaw; Peter C. Brown, Atlanta; Jesse R. Whittemore, Woodstock, all of Ga.

[73] Assignee: The Tensar Corporation, Atlanta, Ga.

[21] Appl. No.: 487,640

[22] Filed: Jun. 7, 1995

[51] Int. Cl.[6] .......................... E02D 17/20; E02D 29/02; E02D 31/02
[52] U.S. Cl. .......................... 405/129; 405/258; 405/284; 588/249
[58] Field of Search .................................... 405/128, 258, 405/284; 588/258, 259, 250, 249

[56] References Cited

U.S. PATENT DOCUMENTS

| | | | |
|---|---|---|---|
| 4,011,728 | 3/1977 | Turzillo | 405/222 |
| 4,374,798 | 2/1983 | Mercer | 264/288.8 |
| 4,394,924 | 7/1983 | Zacceroni | 405/32 X |
| 4,464,081 | 8/1984 | Hillier et al. | 588/259 |
| 4,473,477 | 9/1984 | Beall | 588/259 |
| 4,483,640 | 11/1984 | Berger et al. | 405/15 |
| 4,530,622 | 7/1985 | Mercer | 405/258 |
| 4,572,705 | 2/1986 | Vignon et al. | 405/16 |
| 4,594,206 | 6/1986 | Grafton | 405/29 X |
| 4,655,637 | 4/1987 | Vignocchi | 405/17 |
| 4,726,708 | 2/1988 | Papetti | 405/19 |
| 4,904,124 | 2/1990 | Egan | 405/258 X |
| 5,076,735 | 12/1991 | Hilfiker | 405/284 |
| 5,102,260 | 4/1992 | Horvath et al. | 405/284 X |
| 5,333,970 | 8/1994 | Heselden | 405/286 |
| 5,472,297 | 12/1995 | Heselden | 405/286 |

FOREIGN PATENT DOCUMENTS 2073281  10/1981  United Kingdom .

*Primary Examiner*—Stephen J. Novosad
*Attorney, Agent, or Firm*—Jacobson, Price, Holman & Stern, PLLC

[57] ABSTRACT

A method of constructing a liner system for a waste containment facility having substantially vertical sidewalls utilizing a plurality of vertical expansion boxes for holding a flexible membrane liner against a rock face or any other approximately vertical face without penetration of liner, liner "creep", slippage or impairment of the integrity of the liner A vertical expansion box provides lateral and vertical pressure onto portions of the flexible membrane liner to hold it firmly in place. The vertical expansion box is constructed such that when, filled with soil or other aggregate material, lateral pressure of the fill will flex the sidewalls of the box, which in turn applies pressure against the liner.

18 Claims, 7 Drawing Sheets

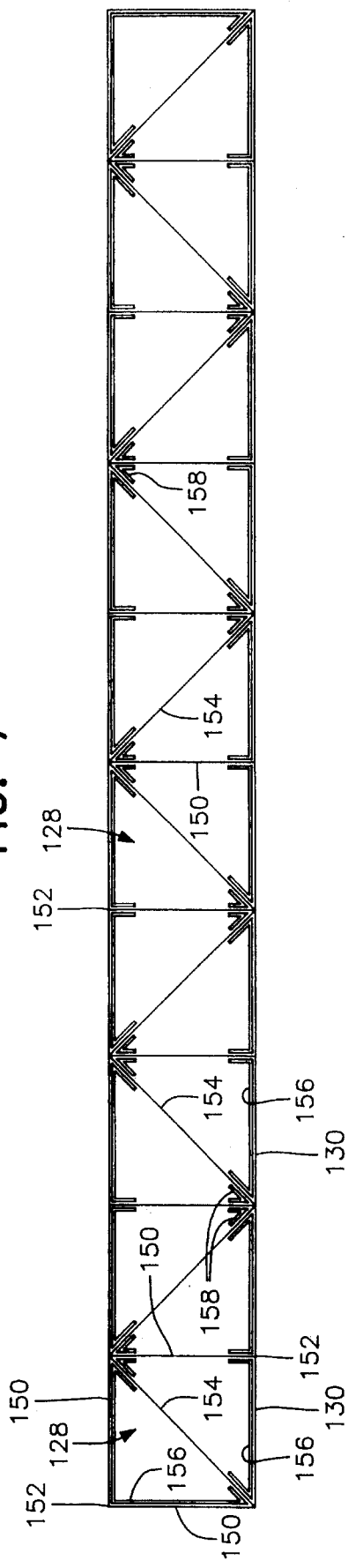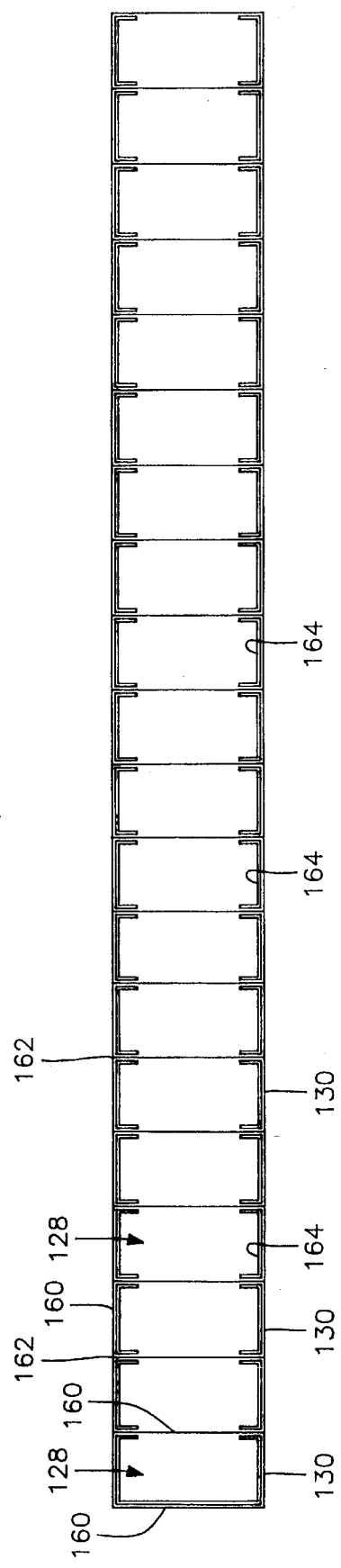

METHOD OF CONSTRUCTING A LINER SYSTEM AND WASTE CONTAINMENT FACILITY INCORPORATING SAME

FIELD OF THE INVENTION

This invention relates to the construction of a liner system, and more particularly to the lining of substantially vertically-extending sidewalls of a waste containment facility with sheets of an impermeable polymeric material to prevent escape of leachate which may contaminate the ground water.

BACKGROUND OF THE INVENTION

As explained in a brochure entitled "Environmental Systems" available from Tensar Environmental Systems, Inc., a subsidiary of The Tensar Corporation ("Tensar") of Atlanta, Ga., the disclosure of which is incorporated herein in its entirety by reference, there are products presently available on the market that enable a fast and economical construction of a waste containment facility which provide maximum capacity for storage of waste materials. Typically, these waste containment facilities, or landfills as they are more commonly referred to, are formed by excavating a pit to a predetermined depth with inclined sidewalls tapering downwardly towards a flat or inclined base.

In many situations, the slope of the sidewalls of such a facility is initially limited by the strength of the earth or soil forming the landfill. The more gradual the slope of the sidewalls, the less landfill space available for a given footprint. Since the availability of landfill space is decreasing, the capacity of each landfill must be maximized. Uniaxial and biaxial geogrids manufactured by The Tensar Corporation can be used to build stable reinforced soil slopes at steeper slope angles, thereby improving site utilization and landfill capacity. For example, a conventional unreinforced soil slope having a ratio of 2.5:1 may be increased to a 1:1 ratio by providing such reinforcing materials in the landfill sidewalls.

Obviously, the most efficient use of a landfill site would be one with vertical sidewalls. However, a further limiting factor on the slope of landfill sidewalls heretofore has been the need to secure liner materials, which are necessary to prevent escape of leachate from the waste material, against slippage. Sidewalls of a landfill are lined with sheets of polymeric material or other impermeable material to form a barrier against such contamination. Layers of geogrid and geofabric material are commonly placed interiorly of the liner to aid in conveying leachate to the bottom of the landfill for transfer to a collection system.

The angle of the sidewalls of a waste containment facility are, therefore, limited to a slope beyond which the various layers of the liner system would tend to slip, thereby allowing leachate to escape and possibly contaminate the ground water. For this reason, even when a waste containment site with stable vertical or near vertical sidewalls is available, such as in a rock quarry or the like, sloped sidewalls must be provided by further excavation or adding fill to protect against slippage of the liner materials. Alternatively, the liner materials must be secured to the vertical or steeply sloped sidewalls by rock bolts or the like, a costly procedure which introduces additional problems by necessarily piercing the liner material thereby destroying its integrity.

SUMMARY OF THE INVENTION

Therefore, it is a primary object of the present invention to provide a system for securing a flexible membrane liner against a substantially vertical sidewall of a waste containment facility such as a rock face of a quarry or the like without penetration of the liner, liner "creep" or impairment of the integrity of the liner. To this end, a "vertical expansion box" is provided which is constructed with sidewalls that, when the box is filled with soil or aggregate material, will have limited lateral flex to apply pressure against vertically-extending portions of a liner material which provides support and holds it in place, while upper and lower portions of the liner material are securely held between superimposed boxes during construction and/or expansion of the landfill facility.

The vertical expansion box system of this invention allows for a maximization of available air space (waste storage volume) within an existing vertical waste containment area. Therefore, it is not necessary, in the case of a quarry, for example, to either build a sloped sidewall or to excavate the quarry to form a sloped sidewall, since a vertical sidewall is used.

The vertical expansion box system of this invention is designed to maintain liner integrity by minimizing the vertical hang of liner material to approximately ten feet. The liner materials need not be punctured as was necessary with the prior art technique of securing the liner to the sidewalls by using rock bolts or other such means. The flexible membrane liner material may also be seamed along a horizontal plane according to the system of this invention which allows for better weld control, producing increased efficiency and economy.

In the use of the instant inventive concepts to construct a waste containment facility, the flexible membrane liner material extends behind rows of vertical expansion boxes to thereby protect the liner material from weather and other potentially damaging environmental exposure, such as exposure to ultraviolet radiation. The flexible membrane liner can be extended laterally and vertically along the sidewalls of a landfill only as additional space is needed, preventing "weathering" of uncovered membrane as results when the entire landfill is lined before use of the facility. Also, it is only necessary to install vertical expansion boxes (and therefore sections of liner) on an as needed basis rather than encountering the expense of lining all the walls of a quarry or the like prior to initiating use of the facility as a landfill.

The use of vertical expansion boxes according to the present invention essentially provides a free-standing secondary wall which exerts lateral pressure onto a flexible membrane liner to hold it securely in place on a substantially vertical rock face while defining an interior wall free of fractures and incompetent material which may exist with a preexisting rock sidewall. The structure of the vertical expansion box can be rigid or somewhat flexible so that it can conform to substantially any configuration of existing vertical sidewall. In this latter respect, the walls of the vertical expansion box are preferably constructed from flexible materials which are biologically and chemically compatible with surrounding components of a landfill. Therefore, the walls of the vertical expansion box are preferably formed by polymeric grid, either biaxial or uniaxial, although wire mesh or any other construction materials which are flexible enough to put lateral and horizontal pressure on a flexible membrane liner may be used.

The fill material for the vertical expansion box must not flow through the openings of the wall material. Therefore, it may be necessary to line the walls of the vertical expansion box with a fabric material so as to retain fill containing significant quantities of a material smaller than openings in the wall material.

Landfill-generated waste by-products may be controlled by providing a vertical drainage layer between the rock wall and the vertical expansion box which will promote venting of landfill-generated gasses in the event they migrate beyond the landfill liner. Further, hydraulic conductivity of the permeable material used to fill the vertical expansion box can be selected to promote lateral and vertical migration of leachate and gases to an underlying collection system which acts as a perimeter leachate and gas containment conduit.

It is, thus, an important object of the present invention to provide a method of constructing a liner system for a landfill having substantially vertical sidewalls where the liner is supported by a plurality of vertical expansion boxes which exert a lateral pressure on the liner while conforming to the pattern of the vertical sidewalls.

It is yet another object of the present invention to provide a vertical expansion box which is sufficiently flexible and which conforms to the configuration of an existing vertical sidewall so as to support a flexible membrane liner between the vertical sidewall and the vertical expansion box while directing leachate flow through the vertical expansion box to a leachate collection system located at a bottom surface of the landfill.

It is still a further object of the present invention to form a landfill from a site having existing vertically-extending or substantially steep or benched (staggered) sidewalls and to line the sidewalls with sections of flexible liner material supported by vertical expansion boxes to thereby provide an interior or secondary wall formed by the vertical expansion boxes which is free of fractures and incompetent material thereby providing an added safety feature during construction and operation of a landfill.

These and other objects of the invention, as well as many of the attendant advantages thereof, will become more readily apparent when reference is made to the following description taken in conjunction with the accompanying drawings.

BRIEF DESCRIPTION OF THE DRAWINGS

FIG. 3 is a fragmentary schematic sectional view of a known system for lining an existing vertical rock face with sections of a flexible liner membrane which are secured in place by rock bolts or the like;

FIGS. 7 and 8 are plan views of alternative constructions of vertical expansion boxes.

DETAILED DESCRIPTION OF THE PREFERRED EMBODIMENTS

Figure 1:
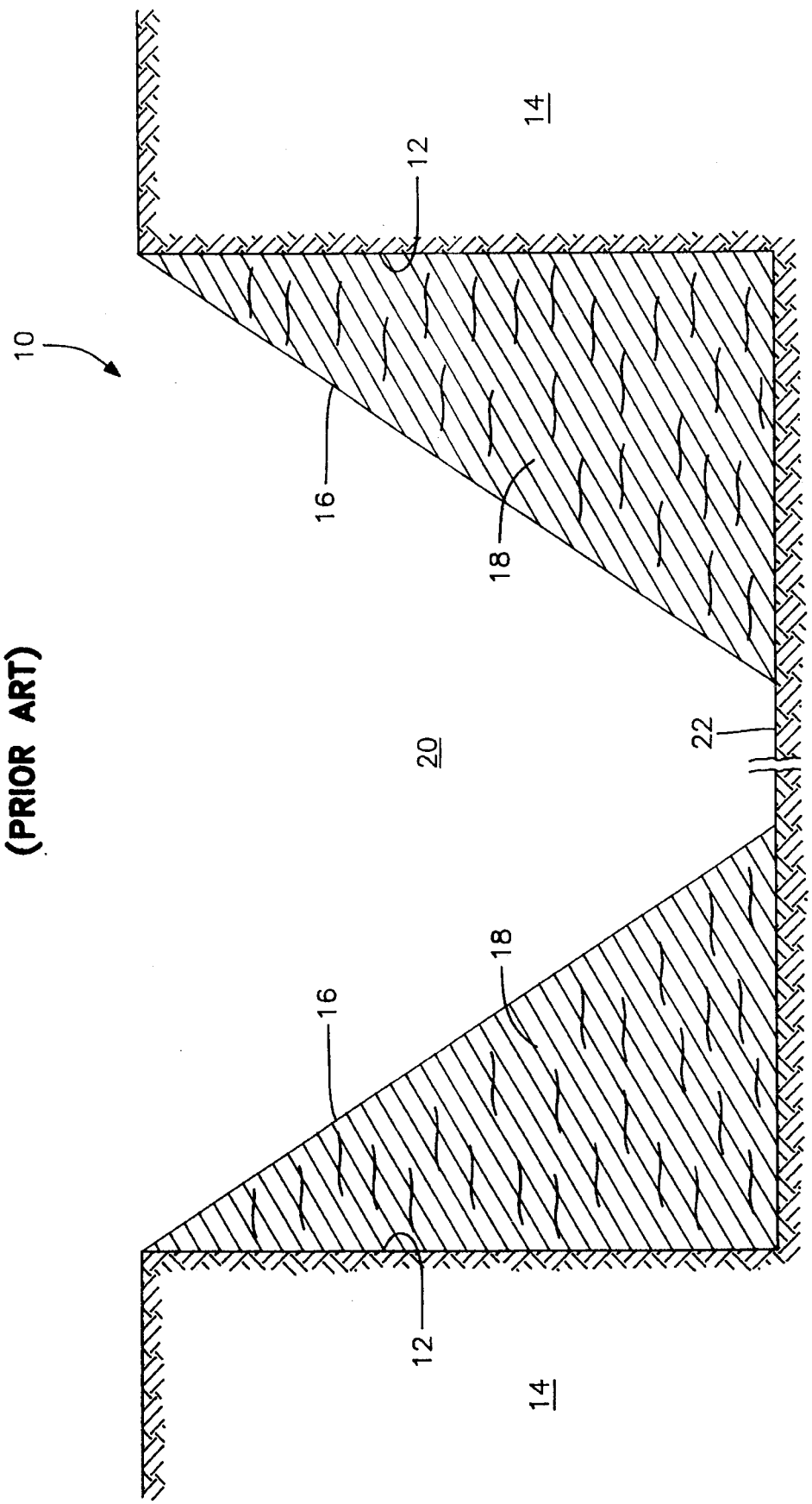
FIG. 1 is a schematic cross-sectional view, partially broken away for illustrative convenience, showing a known system for building up inclined sidewalls from an existing vertical rock face to minimize liner creep.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
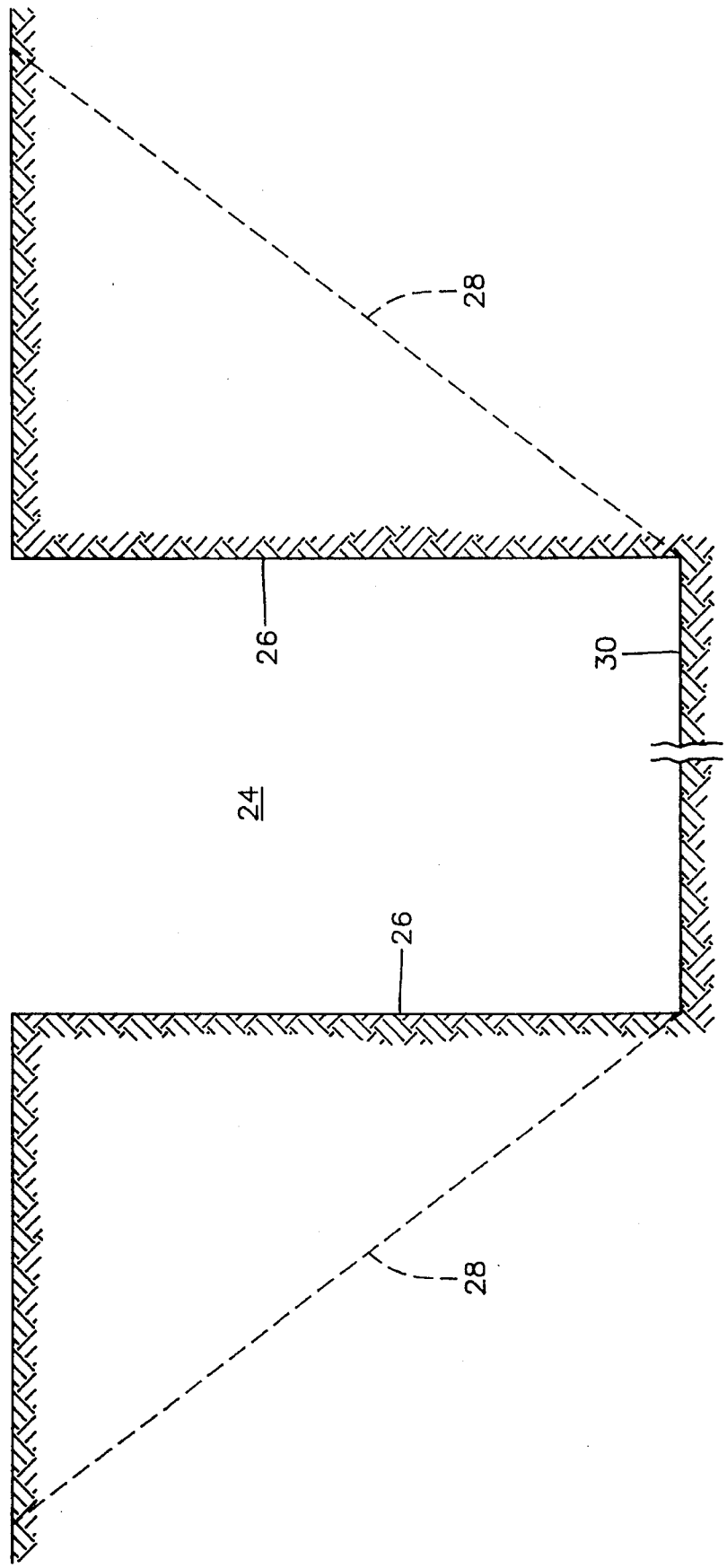
FIG. 2 is a similar view illustrating an alternate technique whereby portions of an existing vertical rock face are removed to form inclined sidewalls.
Figure 3:
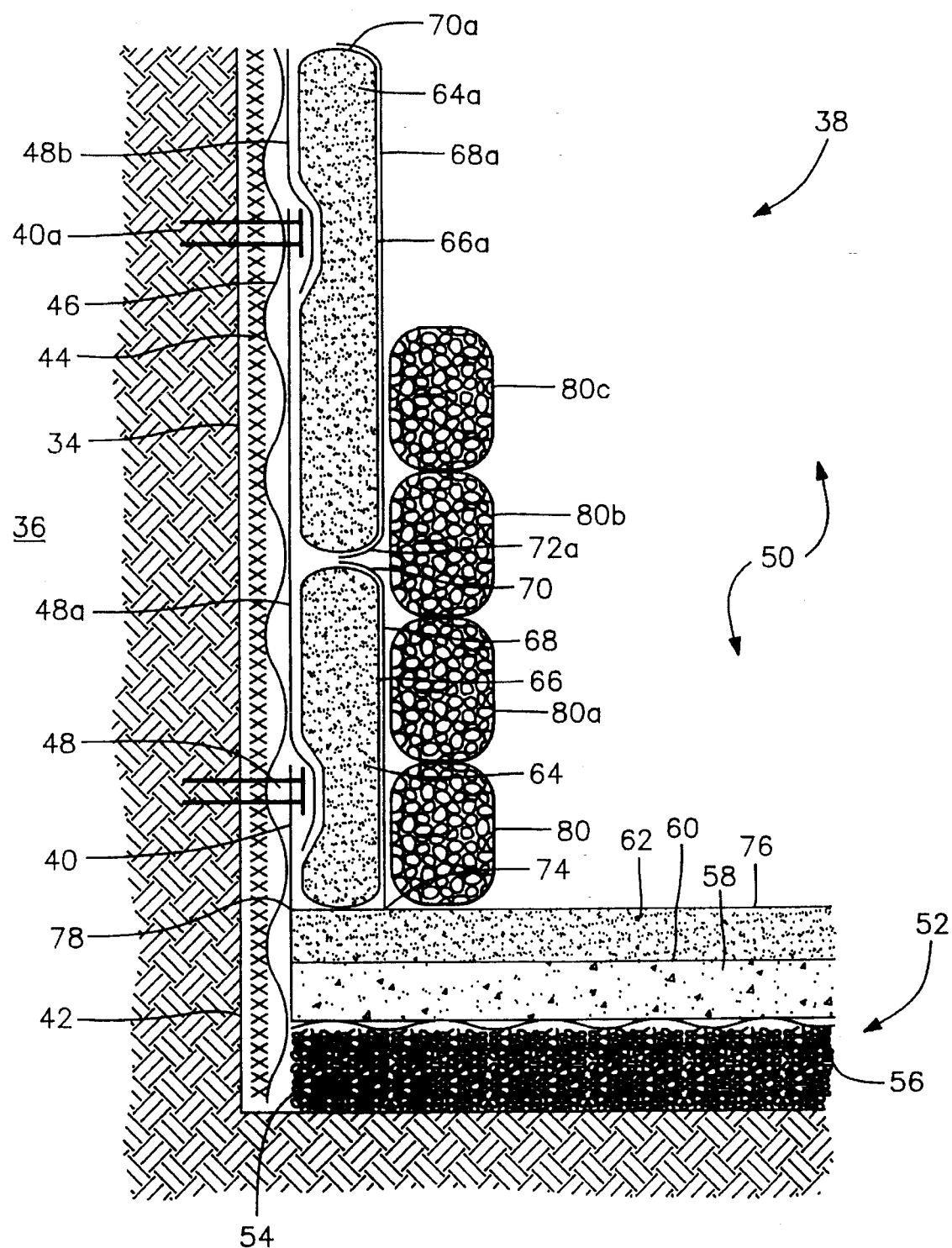

Referring first to FIGS. 1–3, several prior art techniques for constructing waste containment facilities from an existing quarry or the like are seen. According to one technique, schematically illustrated in FIG. 1, the existing substantially vertically-extending faces 12 of a quarry 10 define an exposed exterior surface of the rock material 14. According to this technique, built-up sloped faces 16 are created by the addition of soil 18 with or without reinforcing materials such as geogrids, to achieve a desired slope capable of supporting the liner materials (not shown) without slippage. The area 20 defined between opposed built-up sloped faces 16 and the bottom surface 22 of the former quarry 10 remains for use as a landfill in the traditional sense. As will be readily understood, the partial filling-in of the quarry with soil 18 to create an artificial sloped face 16 is expensive and significantly reduces potential waste containment space.

In FIG. 2, an existing quarry 32, having vertical rock faces 26, is excavated until a desired sloping face 28 is created as is necessary to support the liner materials without slippage with this technique, the bottom surface 30 of the quarry 32 and the sloped sidewalls 28 would then form a waste containment area 24 of significantly increased footprint as compared to the original quarry 32. However, modification of an existing vertical face by additional excavation is not an economical procedure.

In an attempt to utilize the existing vertically-extending face 34 of a rock wall 36, as may exist in a quarry 38, without producing sloping sidewalls to thereby maximize the use of waste containment space, systems as shown and similar to that shown in FIG. 3 have been implemented. In this construction, a plurality of vertically spaced rock bolts 40, 40a secure a wire mesh 42 and a composite including a geonet layer 44 and a geotextile layer 46 to the vertical rock face 34 to aid in leachate collection and the venting of gases. Also secured to the vertical rock face 34 by the rock bolts 40, 40a are vertically-extending sections of a flexible membrane liner 48, 48a, 48b such as sheets of HDPE polymer. As will be seen in FIG. 3, the section 48a hangs down from an upper rock bolt 40a so as to cover the exposed free end of the lowermost rock bolt 40. Likewise, the section 48b hangs down from a higher rock bolt (not shown) to cover the free end of rock bolt 40a. Thus, the liner sections form a continuous layer of liner material along the vertical rock face 34 to prevent escape of leachate from the waste 50 located within the landfill 38. The sections of liner 48, 48a, 48b include vertically-extending seams (not shown) so as to secure adjacent sections together. In the event of a breach in the liner, the geonet/geotextile composite 44, 46 will convey escaping leachate to a leachate collection system.

Commonly, at the base 52 of the landfill 38 is a layer of gravel 54. On top of the layer of gravel in successive order is a geotextile 56, followed by a clay layer 58, a high-density polyethylene liner 60, and finally a sand layer 62.

To hold the sections 48, 48a, 48b of liner material in place, a plurality of buffers 64, 64a comprising a fabric sack filled with sand are placed against the protruding ends of the rock bolts 40, 40a. Further, sections of liner material 68, 68a are wrapped about the faces 66, 66a of the sand buffers 64, 64a with their upper and lower edges 70, 70a and 72, 72a extending over the top and bottom surfaces thereof, or secured as at 74 to a length of liner material 76 located above the sand layer 62. Similarly, the lowermost section of liner 48 extending from the lowermost rock bolt 40 is secured at 78 to the liner 76. The ends of the sections 68, 68a are thereby held in place between adjacent sand buffers 64, 64a.

To secure the sand buffers 64, 64a in place and hold the liner sections 68, 68a against sliding, a plurality of rock-filled gabions 80, 80a, 80b, 80c are stacked in front of the sand buffers 64, 64a. It is understood that, while not shown for illustrative convenience, the gabions are stacked to the height of the uppermost sand buffer. Likewise, the geonet 44, geotextile 46, and liner sections extend along the entire height of the rock face 34 so as to prevent leachate from escaping from the landfill 38.

In addition to the obviously labor-intensive nature of the system of FIG. 3, another problem encountered with the use of this system, is that, notwithstanding the complexity of the structure, sections of the liner 48 still tend to move or "creep" which produce gaps and allow escape of leachate. Moreover, the integrity of the liner sections is compromised since the pressure created by the sand buffers and rock-filled gabions against the exposed free end of the rock bolts can tend to puncture the liner material.

Figure 4:
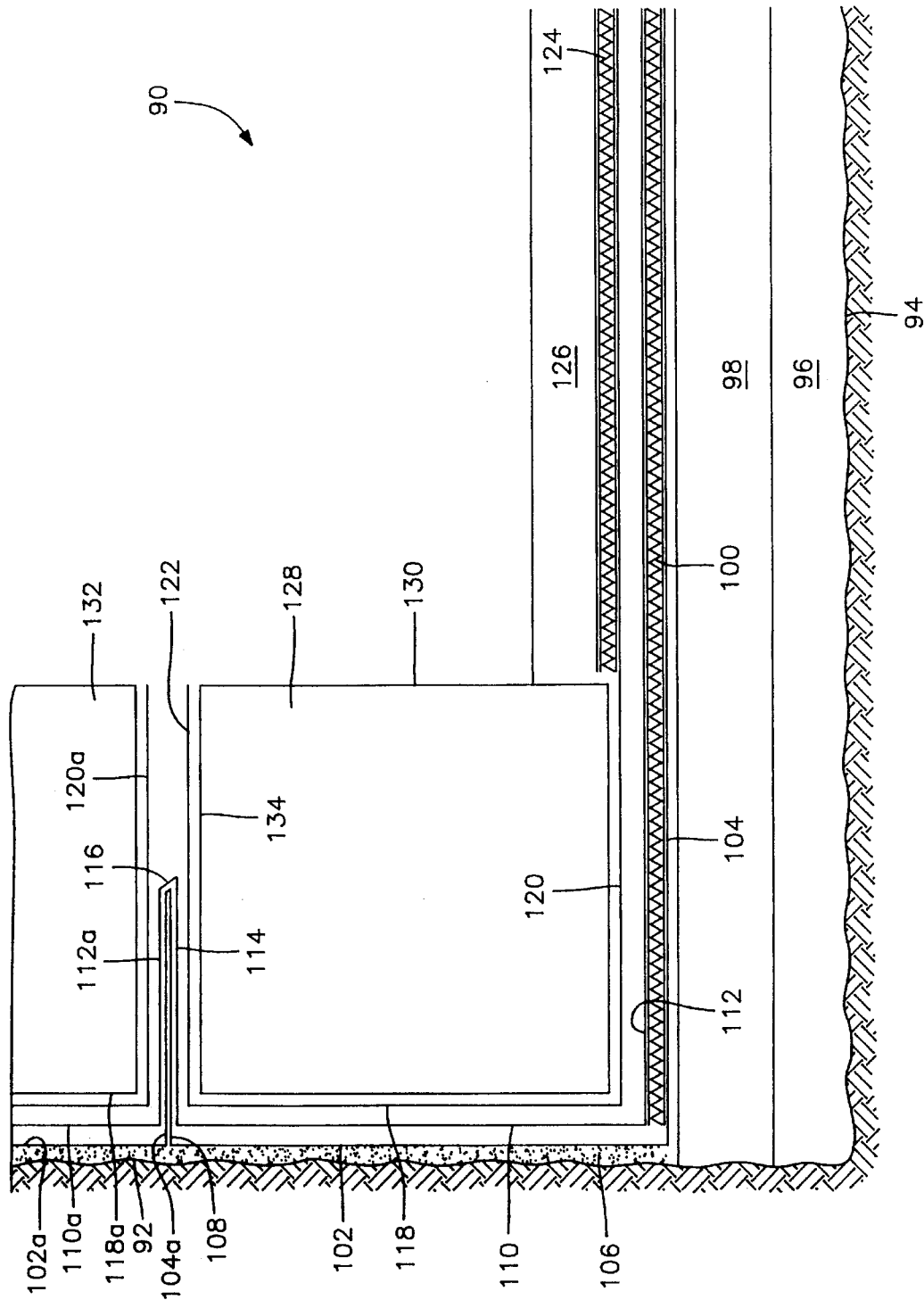
FIG. 4 is a fragmentary schematic sectional view illustrating the use of a vertical expansion box according to the present invention to support a flexible membrane liner adjacent an existing vertical rock face.
Figure 5:
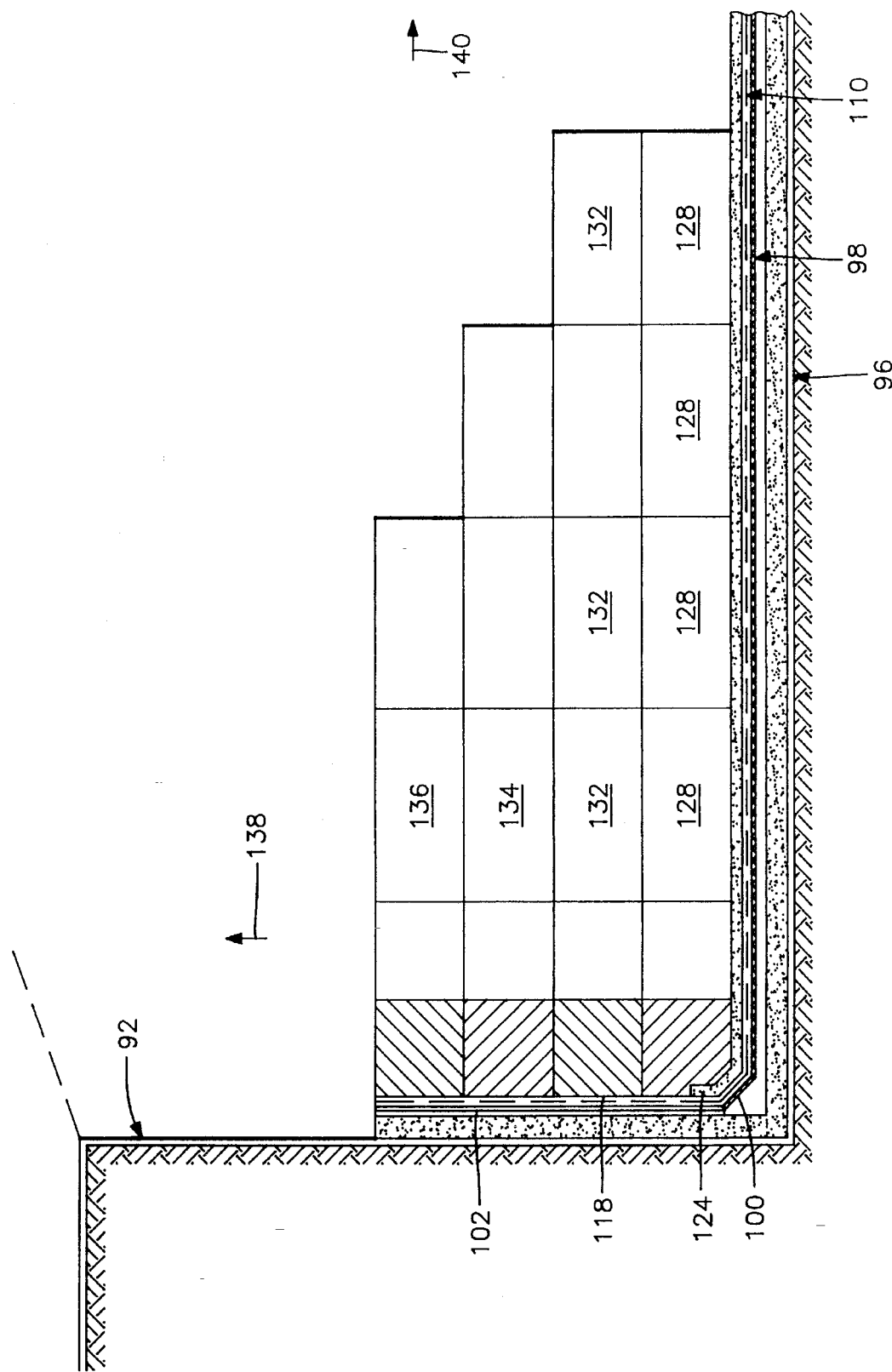
FIG. 5 is a side view, partially in section, illustrating the manner in which a plurality of vertical expansion boxes may be used to line vertical faces of a waste containment facility pursuant to this invention.
Figure 6:
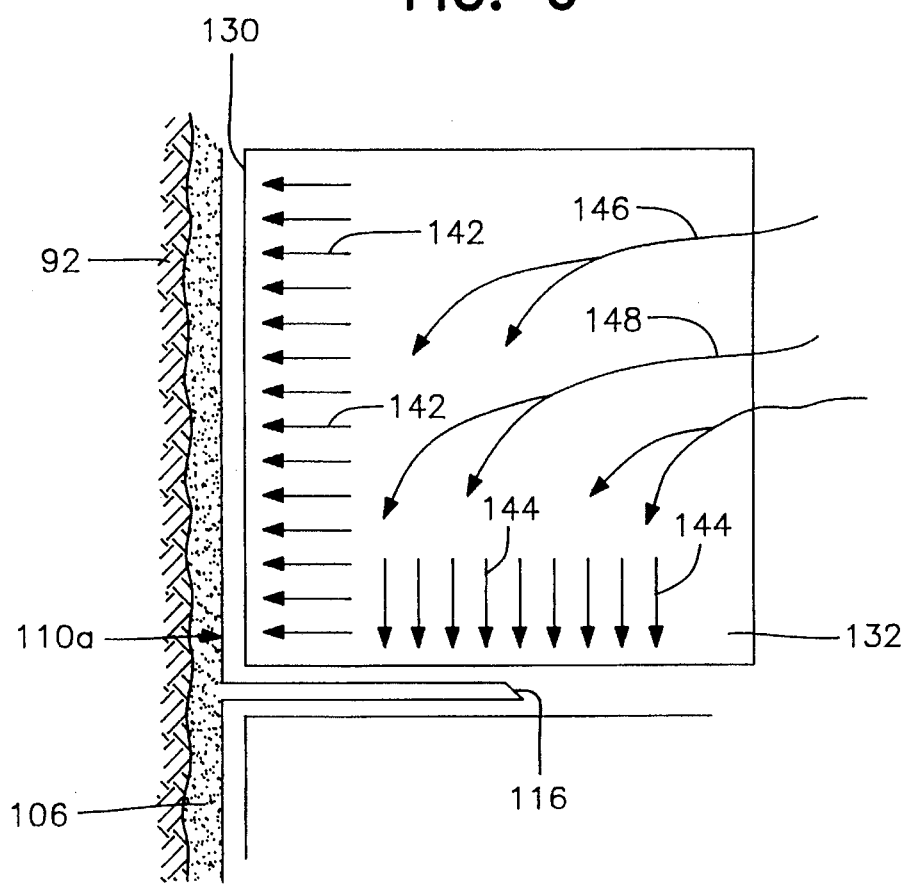
FIG. 6 is a schematic drawing illustrating the forces applied to a flexible membrane liner with the use of a vertical expansion box according to the instant inventive concepts.

These and other disadvantages of the prior art techniques for constructing waste containment facilities are overcome with the vertical expansion box system of the instant invention illustrated generally at 90 in FIGS. 4 through 6. By the erection of a liner system on a substantially vertically-extending rock face sidewall, a landfill is established within a preexisting mined area thereby affording maximum utilization of the waste containment area with a minimum footprint and minimum preparation. The ability to maintain the liner against the sidewalls without piercing the flexible membrane prevents potentially hazardous leachate from the landfill waste material escaping to the groundwater.

On the bottom surface 94 of the landfill 90 a layer of leveling sand 96 at a 1 to 2% grade may be provided to control and convey fluids and gas passing through and around the landfill to a collection sump (not shown) as is conventional. On top of the sand layer 96 is a layer of clay 98 and a double-sided drainage composite 100 comprised of a central layer of a geonet covered on opposite sides by layers of geofabric.

Fabric layers 102, 102a preferably extend along the vertically-extending sidewall 92. The fabric layer 102 turns horizontally at the intersection of the vertically-extending sidewall 92 and bottom surface 94 and extends along the top of the clay layer 98 to form a horizontally-extending section 104 lying beneath the double-sided drainage composite 100. Located between the fabric layers 102, 102a and the sidewall 92 is a porous media layer 106, which may be formed of sand or a double sided drainage composite, for example.

Each section of fabric layer 102, 102a has a portion extending substantially parallel to the vertically-extending sidewall 92, a lower horizontally-extending portion 104, 104a and an upper horizontally-extending portion 108 (only one being shown). However, each upper horizontally-extending portion of fabric layer is covered by a lower horizontally-extending portion of an adjacent fabric layer located thereabove. The fabric layers 102, 102a serve to maintain the position of the porous media layer 106 and prevents migration thereof. The fabric layers 102, 102a also act as a cushion for the membrane liners 110, 110a, to protect the membrane liners against any abrasions from contracting the sidewall 92 as the various layers are compressed towards the sidewall 92.

The next layers adjacent to the fabric layers 102, 102a are layers of flexible membrane liner 110, 110a which, similar to the fabric layers 102, 102a, include a lower horizontally-extending portion 112, 112a and an upper horizontally-extending portion 114 (only one being shown). At the bottom of the rock face sidewall 92 the lower horizontally-extending portion 112 extends over the double-sided drainage composite 100. As with the fabric layers 102, 102a, the flexible membrane liners 110, 110a include a plurality of sections which are mounted one above the other as shown in FIG. 4 with the upper and lower horizontally-extending portions of superimposed liners being positioned below and above, respectively, interposed upper and lower horizontally-extending portions of adjacent fabric layers.

With the flexible membrane liner sections, each upper horizontally-extending portion is welded or otherwise sealed at a horizontally-extending joint such as seen at 116 to the lower horizontally-extending portion of the next superimposed flexible membrane liner layer. The joints 116 serve to seal leachate from passing to the vertically-extending sidewall 92.

Further fabric layers 118, 118a may be positioned adjacent to the flexible membrane liners 110, 110a and includes lower horizontally-extending portions 120, 120a and an upper horizontally-extending portion 122 (only one being shown). In the case of the lowermost fabric layer 118, the lower horizontally-extending portion 120 extends below a second double-sided drainage composite 124. The double-sided drainage composite 124 supports a protective cover soil layer 126.

To support the succession of porous media layer 106, fabric layer 102, flexible membrane liner 110, and fabric layer 118, a first vertical expansion box 128 is positioned on top of the lower horizontally-extending portion 120 of the fabric layer 118. The sidewalls 130 of the vertical expansion box 128 are made of a grid material such as biaxial geogrid, uniaxial geogrid, wire mesh, or any other construction material which is flexible so as to expand to its limits when erected in a vertical orientation and filled with material.

A preferred grid material known as an integral geogrid, is commercially available from Tensar and is made by the process disclosed in U.S. Pat. No. 4,374,798 ("the '798 patent"), the subject matter of which is incorporated herein in its entirety by reference. In the optimum embodiments of this invention, integral geogrid sheet material which has been uniaxially oriented according to the '798 patent includes a plurality of elongated, parallel, molecularly oriented strands with transversely extending bars integrally connected thereto by less oriented or unoriented junctions, the strands, bars and junctions together defining a multiplicity of elongated openings.

To connect geogrid sections to one another, the strands of one portion of geogrid may be bent to form loops, the loops inserted between the strands of the other portion of geogrid so that the loops project out of the second portion of geogrid, and a vertically extending rod passed through the loops on the opposite side of the second portion to prevent the loops from being pulled back through, thereby forming a tight interconnection between the two portions of geogrid, sometimes referred to as a "Bodkin" joint. The use of a Bodkin joint is disclosed in U.S. Pat. No. 4,530,622 ("the '622 patent") to Mercer, the subject matter of which is incorporated herein in its entirety by reference.

The vertical expansion box 128 is filled with a fill or aggregate material (not shown) which will not penetrate through openings in its sidewalls 130. If a fill material is to be used, such as sand, of a size which may penetrate through the openings of the sidewalls 130, a fabric material (not shown) may be used to line the sidewalls 130 of the vertical expansion box 128 thereby preventing migration of the fill material through the sidewall openings.

Where a double sided drainage composite is used as the porous media layer 106 and when the vertical expansion box is completely filled, the vertically-extending portions of the fabric layer 102, flexible membrane liner 110, and fabric layer 118, are forced toward the vertically-extending sidewall 92 by the expansion of the vertically-extending expansion box 128.

Where sand is used as porous media layer 106 and when the vertical expansion box is completely filled, the vertically-extending portions of the fabric layer 102, flexible membrane liner 110, and fabric layer 118, are forced toward the vertical expansion box by the sand 106 placed between the vertically-extending sidewall 92 and the fabric layer 102.

The layers 102, 110, and 118 are thereby held in vertically-extending orientation without the need for rock bolts or other invasive securing means. The horizontally-extending portions 122, 114, and 108 of the lowermost liner layers are then laid on top of the lowermost filled vertical expansion box 128.

To build a row of superposed vertical expansion boxes, the lower horizontally-extending portions 104a, 112a, and 120a of the next higher section of liner material 110a are laid on top of the lowermost vertical expansion box 128 with the flexible membrane liner sections 110, 110a welded or otherwise sealed together at joint 116 to form an impermeable membrane layer. Another vertical expansion box 132 is placed upon the top of the lower vertical expansion box 128 to compress the various lower and upper portions of the fabric layers and membrane liner by the filling of the vertical expansion box 132, as was described with reference to vertical expansion box 128.

The series of layers positioned between the sidewall 92 and the vertical expansion boxes 128, 132 is repeated in building successive horizontally-extending rows of vertical expansion boxes. Example of a row of vertical expansion boxes 128 or 132 are shown in FIGS. 7 and 8.

In FIG. 7, the exposed sidewall 130, as also seen in FIG. 4, is shown for each of a plurality of vertical expansion boxes 128, for example. Each vertical expansion box includes three other sidewalls 150 to form a box of a square configuration. Sidewalls 150 are also made of geogrid and each intersection between sidewalls 130 and 150 and between sidewalls 150 and 150 is in the form of a Bodkin connection 152.

As disclosed in the '622 patent, extending diagonally within each box 128 is a length of geogrid 154, anchored at each intersection with sidewall 130 or sidewalls 150 with a Bodkin connection. Geogrid 154, while allowing some lateral expansion of the box 128 upon filling, limits the overall configuration of the box 128 to an approximate square shape. In the absence of geogrid 154, the box would, upon filling, assume a circular configuration or expand until contacting sidewall 92 and then assume an elliptical configuration.

As explained with reference to FIG. 4, all exposed or terminal surfaces of the box 128, when using grid material having openings, with fill material of a size smaller then the openings, also require a fabric material 156, such as a geotextile liner as shown in FIG. 7. The fabric material is located along all the sidewalls of the course of boxes 128 shown in FIG. 7. In addition, strips of fabric material 158 are located in the corners between geogrid 154 and sidewalls 150 at each Bodkin connection 152. The fabric strips also aid in the escape of sand fill material at the Bodkin connections.

In FIG. 8, an alternate arrangement of a course of a plurality of boxes 128 is shown. In this arrangement, the boxes 128 include exterior sidewalls 130, as shown in FIG. 4, and three additional sidewalls 160. The boxes 128 in FIG. 8 assume a rectangular configuration, in a "ladder" arrangement. Due to the limited width of each box 128, the connection of adjacent boxes 128 by Bodkin connections 162, helps retain the shape of the box while allowing some flexing when filled. When grid is used as the sidewall material a fabric material 164, preferably a geotextile liner, is used along the exposed sidewall 130, 160 to retain fill material of a size less than the openings of the grid.

As shown in FIG. 5, a plurality of vertical expansion boxes 132 are positioned on top of a lowermost row of vertical expansion boxes 128. It is understood that successively superimposed rows of vertical expansion boxes, for example 134 and 136, may be placed on top of lower courses of vertical expansion boxes to a desired height to accommodate expected landfill waste deliveries. It is not necessary to completely line the sidewalls 92 of an existing landfill all at once; it only being necessary to line the sidewalls 92 as necessary to create an impermeable membrane liner as the landfill is utilized.

Vertical expansion boxes may be added in the direction of arrow 138 to raise the vertical height of a landfill. Vertical expansion boxes may also be added in the direction of arrow 140 to accommodate a greater width of a desired landfill. In FIG. 5, the ends of vertical expansion boxes which extend parallel to the vertical wall 92 at the corners of the landfill are cross-hatched for illustrative clarity.

In FIG. 6, the expansion forces of a vertical expansion box, for example vertical expansion box 132, are shown. During filling, the fill material forces the sidewalls 130 of each expansion box laterally in the direction of arrows 142 as well as downwardly in the direction of arrows 144. These forces serve to compress the various layers of liners against the existing vertical rock face sidewall 92 and to compress together extended horizontal portions of the various liners interposed between each of the vertical expansion boxes. For illustrative purposes, the fabric liners have been omitted from FIG. 6.

In addition, the leachate produced from the waste material in the landfill pushing up against the vertical expansion boxes can be directed to flow into the vertical expansion boxes in the direction of arrows 146, 148. With the use of porous fill material in the vertical expansion boxes, the leachate is allowed to flow through the vertical expansion boxes and to ultimately reach the horizontally-extending portion 112 of the flexible membrane liner 110 so as to be carried by the double-sided drainage composite 124 to a leachate collection sump.

In addition, ground water seepage from the rock face sidewall 92 can be directed to flow into the porous media layer 106 and can be collected and removed at a bottom collection sump (not shown).

The sidewalls of the vertical expansion boxes exposed to the landfill is of a stable configuration against which waste material may be deposited. Projections or other defects in the vertical rock face sidewall 92 are not in direct contact with the flexible membrane liner which is also isolated from possible contact with the waste material itself, contacting only a smooth, flexible interior sidewall of the vertical expansion boxes.

Figure 9:
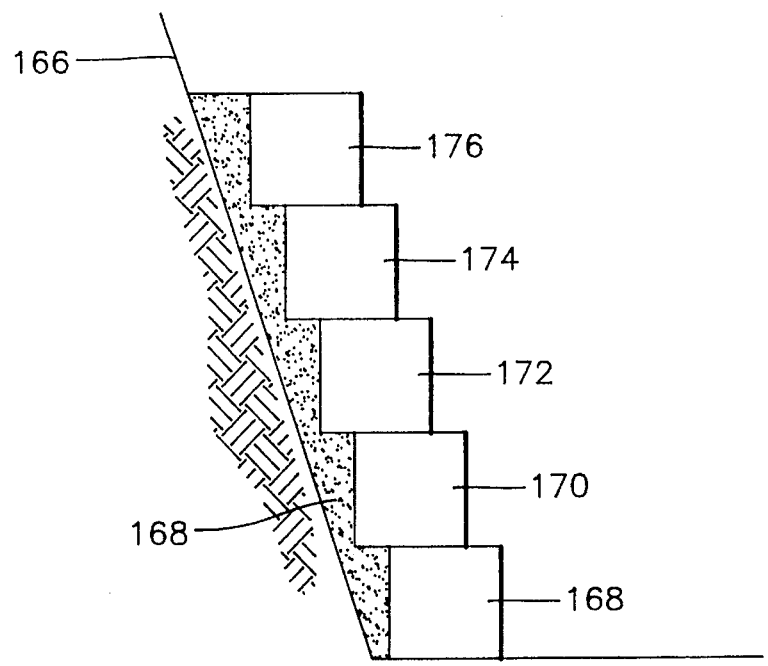
FIG. 9 is an elevational view of a plurality of layers of vertical expansion boxes used in a stair step configuration in a steep slope environment.

In FIG. 9, a steep slope sidewall 166 can use the principles of the present invention by the use of a porous media layer 168 and the same arrangement of liner layers (not shown) as in FIG. 4. To accommodate the slope of the sidewall 166, courses of vertical expansion boxes 168,170, 172,174,176, can be stacked in a stepped or staggered arrangement to compress the interposed layer between the layer 168 and the expansion boxes to insure a sealing of the sidewalls 166 against leakage of leachate.

Having described the invention, many modifications thereto will become apparent to those skilled in the art to which it pertains without deviation from the spirit of the invention as defined by the scope of the appended claims.

We claim:

1. A method of constructing a liner system on a substantially vertically-extending wall, said method comprising:

positioning an impermeable membrane liner adjacent to a substantially vertically-extending wall, and filling an expandable box means with a fill material so as to expand the box means into contact with the membrane liner to hold a portion of the membrane liner in a vertical orientation against the substantially vertically-extending wall with additional portions of the membrane liner extending under and over the box means.

2. A method according to claim 1, wherein said substantially vertically-extending wall is a vertical or steeply inclined face.

3. A method according to claim 2, wherein a layer of porous media is positioned between the membrane liner and the substantially vertically-extending wall.

4. A method according to claim 1, wherein horizontally-extending rows of said box means are positioned along said substantially vertically-extending wall.

5. A method according to claim 1, wherein vertically-extending columns of said box means are superimposed on each other.

6. A method according to claim 5, wherein portions of a membrane liner extending over a lower box means are secured to portions of a membrane liner extending under a superimposed box means by a horizontally-extending seam.

7. A method according to claim 1, wherein said membrane liner is supported substantially solely by said box means.

8. A method according to claim 1, wherein a first fabric liner layer is located between said substantially vertically-extending wall and said membrane liner.

9. A method according to claim 8, wherein a second fabric liner layer is located between said membrane liner and said box means.

10. A method according to claim 9, wherein portions of said first fabric liner layer and said second fabric liner layer extend under and over said box means.

11. A method according to claim 1, wherein said box means includes substantially vertically-oriented sidewalls when filled.

12. A method according to claim 1, wherein said box means is flexible.

13. A landfill comprising:

a substantially vertically-extending wall, an impermeable liner, and a plurality of box means supporting portions of said membrane liner along said substantially vertically-extending wall, remaining portions of said membrane liner extending between juxtaposed tops and bottoms of superimposed box means.

14. A landfill according to claim 13, wherein said box means is filled with a fill material of a size greater than any openings defined in sidewalls of said box means.

15. A landfill according to claim 13, wherein a porous media layer is located between said wall and said membrane liner.

16. A landfill according to claim 13, wherein said membrane liner is formed of a plurality of sections secured together by horizontally-extending seams interposed between superimposed box means.

17. A landfill according to claim 13, wherein a fabric liner layer is located between said wall and said membrane liner with portions of said fabric liner layer extending along the top and the bottom of each box means.

18. A landfill according to claim 13, wherein a further fabric liner layer is located between said membrane liner and said box means with portions of said further fabric liner layer extending along the top and the bottom of said box means.

* * * * *